(12) United States Patent
Topil

(10) Patent No.: US 7,802,501 B1
(45) Date of Patent: Sep. 28, 2010

(54) WORKPIECE STABILIZER FOR MULTIPLE-JAW CHUCK

(76) Inventor: Lubomir Topil, 34110 State Highway 27, Guys Mills, PA (US) 16327

( * ) Notice: Subject to any disclaimer, the term of this patent is extended or adjusted under 35 U.S.C. 154(b) by 1034 days.

(21) Appl. No.: 11/540,278

(22) Filed: Sep. 29, 2006

(51) Int. Cl.
  *B23B 3/06* (2006.01)
  *B23B 3/00* (2006.01)
(52) U.S. Cl. .......................................... 82/152; 82/153
(58) Field of Classification Search ................. 82/153, 82/152, 155, 132, 137; 29/65; 409/343
  See application file for complete search history.

(56) References Cited

U.S. PATENT DOCUMENTS

| | | | | |
|---|---|---|---|---|
| 3,885,825 A | * | 5/1975 | Amberg et al. | 294/115 |
| 4,300,780 A | * | 11/1981 | Urbanic | 279/4.12 |
| 6,120,220 A | * | 9/2000 | Speare | 408/1 R |
| 2003/0116358 A1 | * | 6/2003 | Rogers | 175/325.2 |

* cited by examiner

*Primary Examiner*—Will Fridie, Jr.
(74) *Attorney, Agent, or Firm*—Richard K Thomson

(57) ABSTRACT

A workpiece stabilizer having a generally cylindrical body can be inserted in the central opening of a multiple jaw chuck and secured therein by tightening a securement nut onto a threaded rod. The end of the threaded rod can be used to engage and stabilize rod stock during its machining. For machining disk-shaped workpieces, a plurality of radially extending arms can be affixed to the cylindrical body portion and cap screws threaded into any of several recesses in the arms, as a function of the workpiece's diameter, to engage and stabilize the disk.

10 Claims, 6 Drawing Sheets

WORKPIECE STABILIZER FOR MULTIPLE-JAW CHUCK

BACKGROUND AND SUMMARY OF THE INVENTION

The present invention is directed to the field of machining of parts. More particularly, the present invention is directed to a workpiece stabilizer useful with multiple jaw chucks.

In machining operations, multiple jaw chucks in lathes and the like, are very useful for a variety of operations. However, operations on certain types of articles are difficult and some type of stabilizer is required. One such application is when turning a relatively thin disk. Application of force by the cutter can cause the disk to cant in the jaws potentially damaging the workpiece as well as the cutter. A similar problem can arise when turning a cylindrical bar: the bar can slip linearly in the jaws such that the proper machining cannot be accomplished.

The stabilizer of the present invention engages a disk-shaped workpiece at three locations on the rear face thereof ensuring its proper alignment throughout the machining operation. In a like manner a single stop engages the end of a cylindrical workpiece and maintains it in its proper axial position as it is machined. The stabilizer of the present invention comprises a generally cylindrical body portion at least partially insertable in a central aperture in the chuck, the body portion having a first end, a second end, and a side wall extending between the first end and the second end, openings being formed in the side wall to form thin-walled regions there between; an aperture extending through the length of the body portion, at least a portion of which is internally threaded; a cylindrical rod being at least partially threaded on its exterior surface with a thread compatible with the internally threaded portion of the aperture; at least one member having a stabilizing surface for engaging the workpiece as it is held in the multi-jaw chuck to prevent its axial movement during machining; a nut having an internally threaded surface which receives the cylindrical rod, expander means having a tapered outer surface, at least a portion of which is received within said aperture; whereby when said nut is tightened upon said cylindrical rod in said aperture, said expander means causes said thin-walled regions to flex outwardly securing said body portion within the central opening of the multi jaw chuck.

More preferably, in one application, the at least one member comprises the cylindrical rod with the stabilizing surface being an end portion which projects outwardly beyond an outer surface of the nut. In a second application, the at least one member comprises at least three members engaging a face of a disk being held by the multiple jaw chuck for machining by a lathe. Each of the at least three members comprises a head of a cap screw radially adjustable by threading into one of a plurality threaded openings in each of three radially extending arms which are threadingly attached to a head portion formed on the generally cylindrical body by an outwardly extending flange formed on a second side of the body distal from the first side which is received in the central aperture in the chuck. The axial position of each of the three members is adjusted by threading each cap screw a greater or lesser amount into one of the plurality of openings. The stabilizer preferably includes a lock nut on each of the cap screws to maintain its axially adjusted position. The stabilizer also preferably comprises three equally spaced lobes connected at the second end and being subdivided into three equal portions at the first end, whereby when the nut is tightened on the threaded rod, the tapered portion thereof flexes the thin-walled regions mounting the three equally spaced lobes outwardly into secure engagement within the central opening of the chuck.

In a first embodiment, the expander means comprises a tapered outer surface on a lead portion of the nut. In a second embodiment, the expander means comprises a cylindrical sleeve having a first outer diameter, a collar having a second greater outer diameter and the tapered outer surface being formed as a transitional zone between the cylindrical sleeve and the collar. In this second embodiment, the expander means further comprises complimentary surfaces formed within the cylindrical body portion interacting with the tapered outer surface of the transitional zone.

Various other features, advantages, and characteristics of the present invention will become apparent after a reading of the following detailed description.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF THE PREFERRED EMBODIMENT(S)

Figure 1:
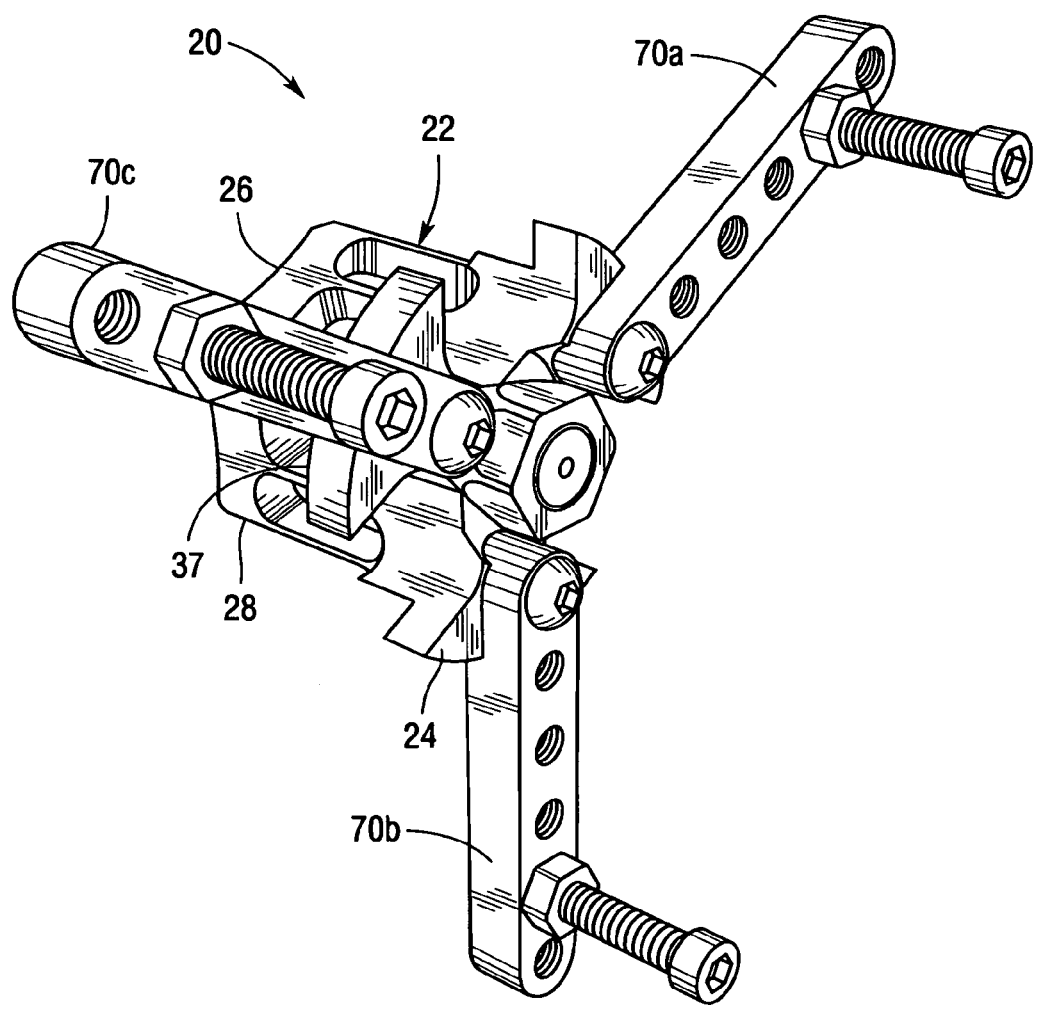
FIG. 1 is a perspective front view of a first embodiment of the workpiece stabilizer of the present invention.
Figure 2:
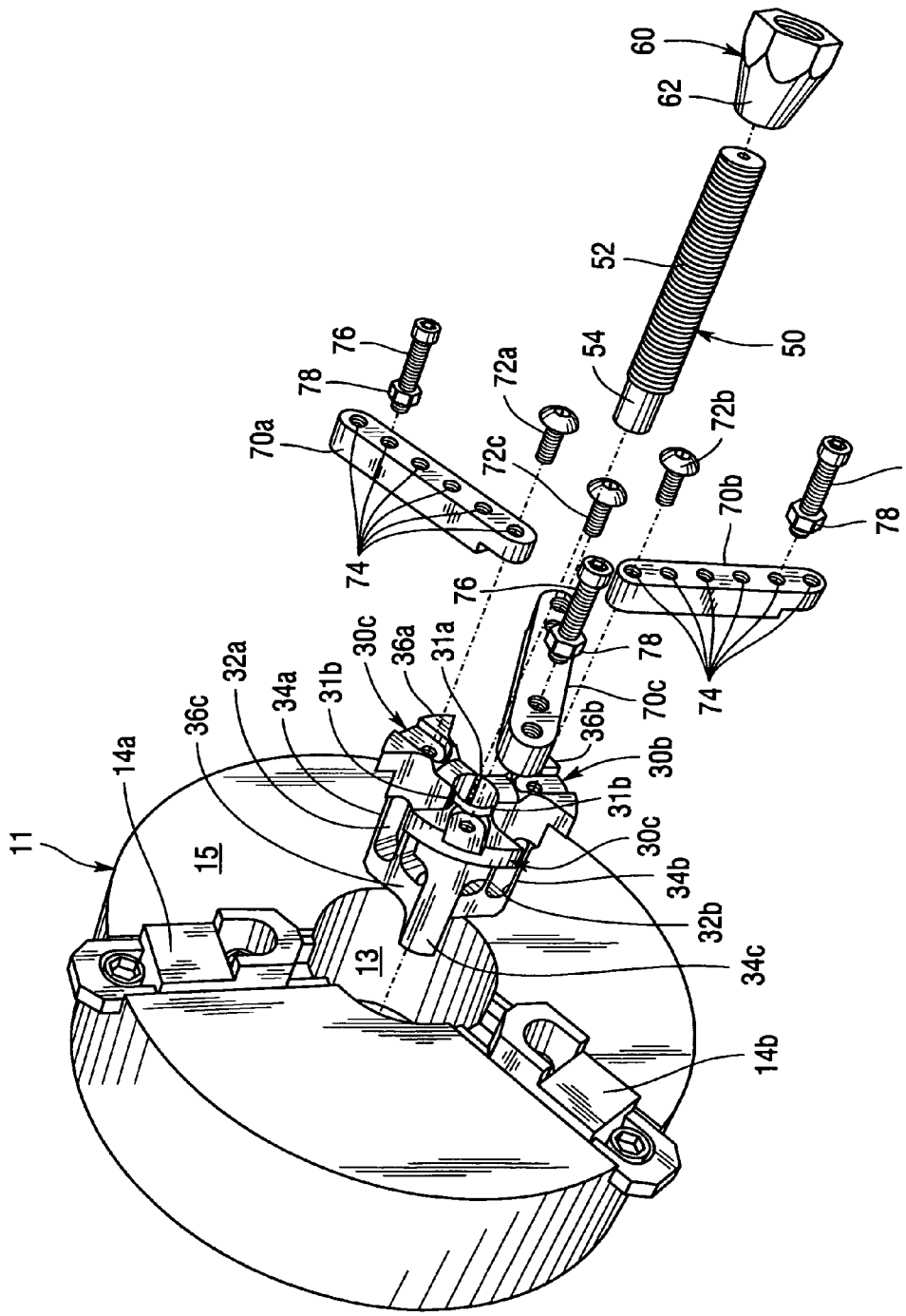
FIG. 2 is an exploded perspective view of the first embodiment of the workpiece stabilizer of the present invention shown positioned adjacent a three jaw chuck.

A first embodiment of the workpiece stabilizer of the present invention is depicted in FIGS. 1-4 generally at 20. Workpiece stabilizer 20 of the present invention comprises a generally cylindrical body portion 22 which is at least partially insertable in the central opening 13 of a multiple jaw chuck 11 (FIG. 2). Body portion 22 has a first end 24, a second end 26 and a sidewall 28 extending between the first and second ends. Body portion 22 has three primary lobes 30a, 30b, and 30c, spaced equally around the periphery of the generally cylindrical body portion. Lobes 30a, 30b, and 30c are connected at second end 26 while being separated by spaces 31a, 31b, and 31c at first end 24. Each lobe 30a, 30b, and 30c has a window opening 32a, 32b, 32c formed therein creating thin walls 34a, 34b, and 34c. Three ears 36a, 36b, and 36c extend outwardly from the lobes 30a, 30b, and 30c forming an abutment surface 37 which engages the front surface 15 of the multiple-jaw chuck 11. Each ear 36a, 36b, and 36c has a slot 38a, 38b, and 38c, respectively, formed in the face thereof.

Central aperture 40 extends throughout the length of body portion 22. An innermost portion 42 of central aperture 40 is threaded with a thread design compatible with the external thread 52 on cylindrical rod 50. The central portion 44 of aperture 40 is hollowed out to reduce overall weight of the stabilizer 20, while the outermost portion 46 is bored to a diameter sufficient to avoid engagement with the external thread 52 on rod 50. A securement nut 60 has a tapered portion 62 which engages in outermost aperture portion 44 flexing thin walls 34a, 34b, and 34c mounting lobes 30a, 30b, and 30c outwardly to secure stabilizer 20 in central opening 13 of chuck 11.

Figure 3:
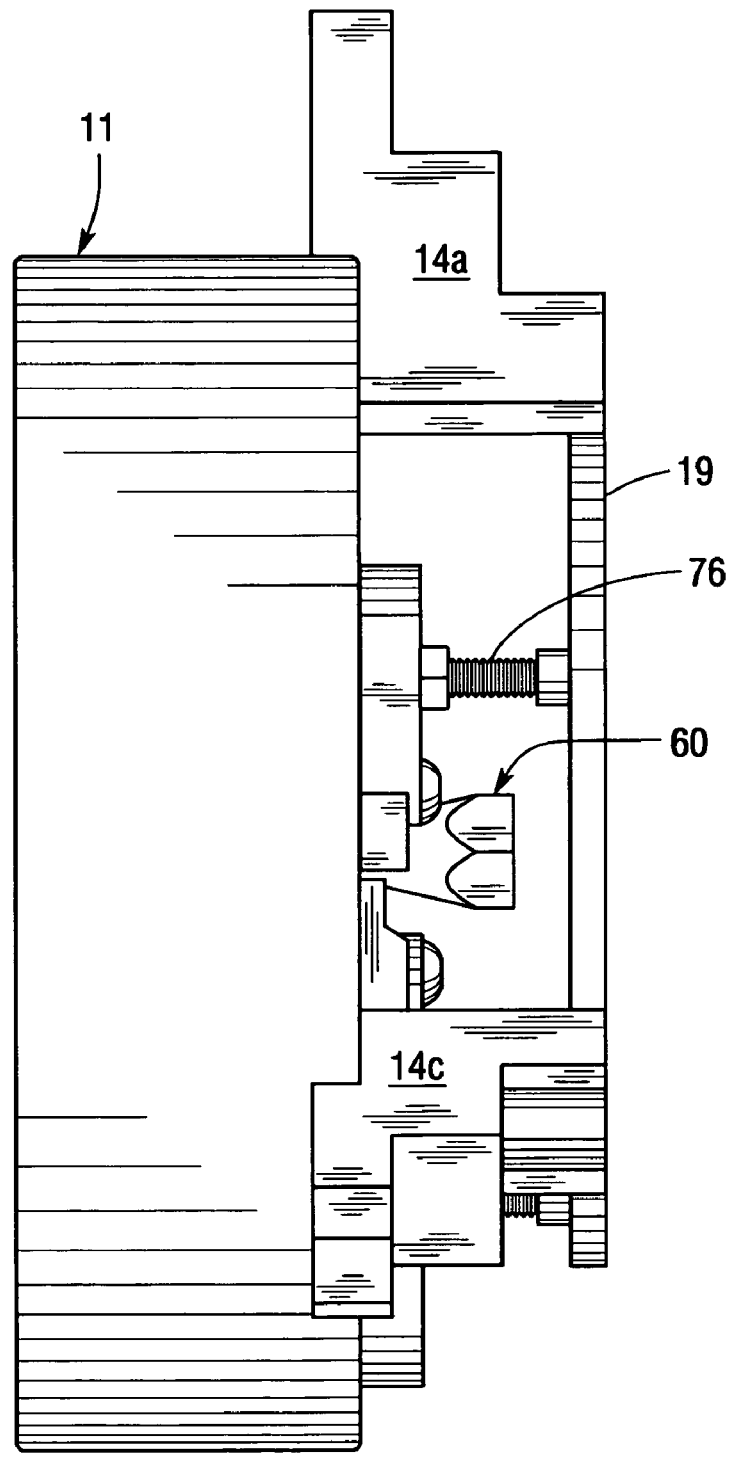
FIG. 3 is a side view of the first embodiment of the workpiece stabilizer of the present invention depicted securing a disk-shaped workpiece.

In applications for stabilizing disk-shaped workpieces 19 (as shown in FIG. 3), and the like, a plurality of arms (three being shown) 70a, 70b, and 70c can be attached in slots 38a, 38b, and 38c, respectively, and secured therein by pan head screws 72a, 72b, 72c, respectively. Arms 70a, 70b, and 70c extend radially outwardly away from aperture 40. Each arm 70a, 70b, and 70c has a plurality of internally threaded throughbores 74 for receiving a cap screw 76 at a radially outward position suitable for the diameter of the workpiece 19 to be engaged. Once the cap screws 76 are adjusted to a suitable depth within throughbores 74, lock nuts 77 prevent them from undesired changes in position.

Figure 4:
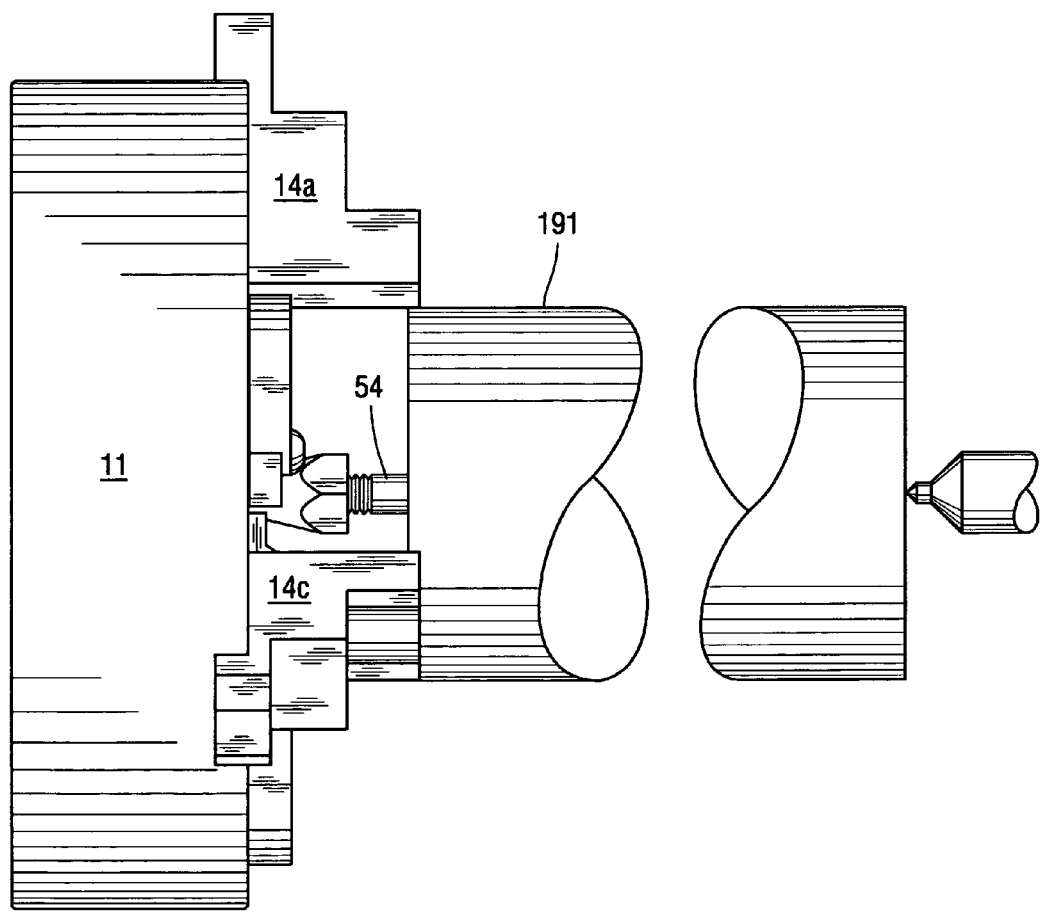
FIG. 4 is a side view of the first embodiment shown securing a cylindrical workpiece.
Figure 5:
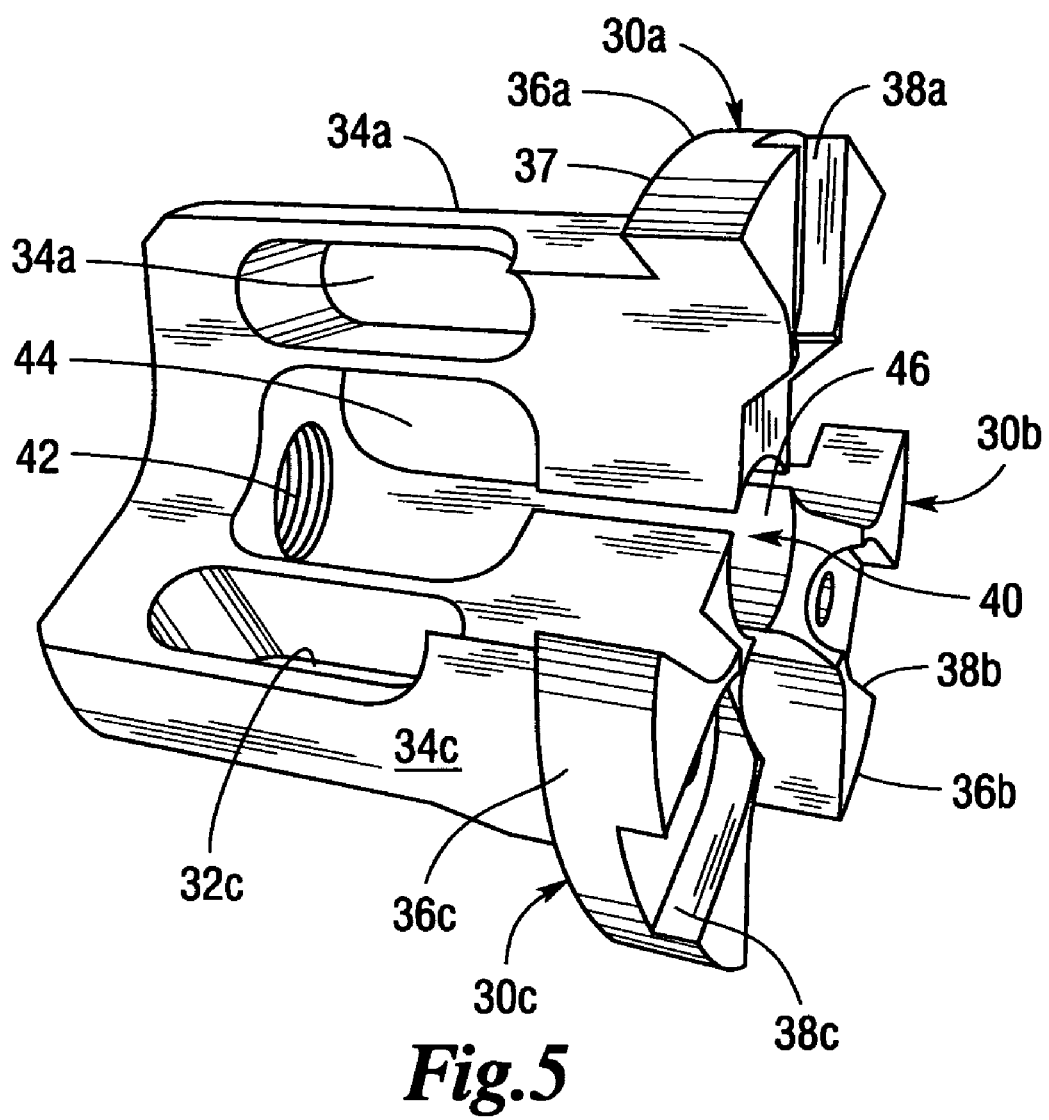
FIG. 5 is a side perspective view of the body portion of the first embodiment; and, FIG. 6 is a perspective front view of a second embodiment of the present invention.

For applications in stabilizing rod stock (as shown in FIG. 4), arms 70a, 70b, and 70c are not used. Instead, the end of rod 50 serves to ensure that the position of rod stock workpiece 191 does not move during machining. Rod 50 has an unthreaded portion 54 and may be turned end for end to provide additional extension length for shorter workpieces 191, as seen in FIG. 4. It will be appreciated that this first embodiment of workpiece stabilizer 20 is suitable for heavy duty applications, due to the robust configuration of the embodiment.

Figure 6:
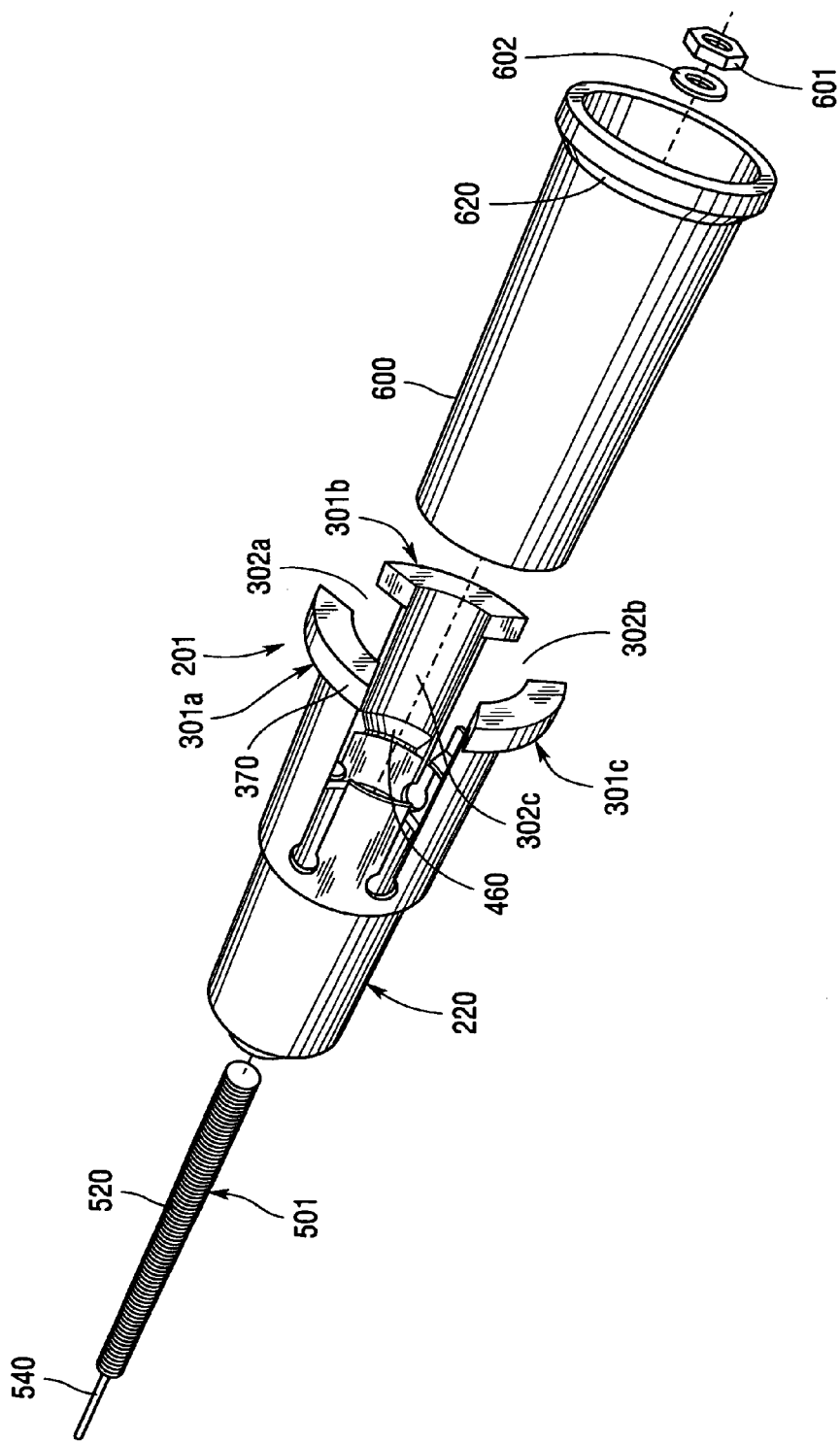

A second embodiment of the present invention is depicted in FIG. 6 generally at 201. This second embodiment is intended for medium-to-light duty and for gripping small diameter workpieces. Body portion 220 has a plurality of lobes 301a, 301b, and 301c with gaps 302a, 302b, and 302c to permit passage of jaws 14 of multiple-jaw chuck 11. With the unthreaded end 541 of rod 501 having a diameter of 0.10 inches, by reversing the position of rod 501 from how it is shown in FIG. 6, workpiece stabilizer 201 can be used with rod stock having a diameter of 1/8" or greater.

Second embodiment 201 functions in the same manner as the first. Cylinder 600 performs the expansion function performed by the tapered portion 62 on securement nut 60 of the first embodiment. Cylinder 600 has a beveled surface 620 which engages complementarily tapering surfaces 460 inside lobes 301a, 301b, and 301c. Securement nut 601 in this second embodiment is used with lock washer 602 to prevent undesired loosening once the nut 601 has been secured in place on threads 520 of threaded rod 501. Threaded rod 501 will be situated with either the butt end of threaded portion extending outwardly or with unthreaded end 541 extending toward the workpiece. Obviously, greater stability will be obtained if the butt end of the threaded portion engages the workpiece. However, if the workpiece has a diameter of less than 0.3", the unthreaded end 541 will need to be positioned outwardly. With abutment surface 370 firmly seated upon front face 15 of multiple jaw chuck 11, securement nut 601 is tightened down on threads 520 drawing cylinder 600 into the body member 220 so that beveled surface 620 engages tapering surfaces 460 expanding lobes 301a, 301b, and 301c outwardly to secure workpiece stabilizer 201 inside central opening 13 in chuck 11.

Workpiece stabilizer 20, 201 can be used with any variety of workpiece sizes and shapes in a multiple jaw chuck to stabilize the workpiece against movement during machining. Arms 70 (three being shown) with cap screws 76 can be used for engaging thin disks 19. Threaded rods 50, 501 can be used with various diameter rod stock 191 to stabilize it against movement during machining.

Various changes, alternatives, and modifications will become apparent to a person of ordinary skill in the art after a reading of the foregoing specification. It is intended that all such changes, alternatives, and modifications as fall within the scope of the appended claims be considered part of the present invention.

I claim:

1. A stabilizer for a workpiece being held in a multi-jaw chuck, said stabilizer comprising
   a) a generally cylindrical body portion at least partially insertable in a central opening in the chuck, said body portion having a length, a first end, a second end, and a side wall extending throughout said length between said first end and said second end, openings being formed in said side wall to form thin-walled regions there between;
   b) an aperture extending through said length of said body portion, at least a portion of which is internally threaded;
   c) a cylindrical rod being at least partially threaded on its exterior surface with a thread compatible with said internally threaded portion of said aperture;
   d) at least one member having a stabilizing surface for engaging the workpiece as it is held in the multi-jaw chuck to prevent its axial movement during machining;
   e) a nut having an internally threaded surface which receives said cylindrical rod,
   f) expander means having a tapered outer surface, at least a portion of which is received within said aperture;
   whereby when said nut is tightened upon said cylindrical rod in said aperture, said expander means causes said thin-walled regions to flex outwardly securing said body portion within the central opening of the multi-jaw chuck.

2. The stabilizer of claim 1 wherein said at least one member comprises said cylindrical rod with said stabilizing surface being an end portion which projects outwardly beyond an outer portion of said nut to engage an end of a cylindrical article being machined.

3. The stabilizer of claim 1 wherein said at least one member comprises at least three members engaging a face of a disk being held by the multiple jaw chuck for machining by a lathe.

4. The stabilizer of claim 3 wherein each of said at least three members comprises a head of a cap screw radially adjustable by threading into one of a plurality threaded openings in each of three radially extending arms which are threadingly attached to a head portion formed on said generally cylindrical body by an outwardly extending flange formed on a second side of said body distal from said first side which is received in the central aperture in the chuck.

5. The stabilizer of claim 4 wherein an axial position of each of said three members is adjusted by threading each said cap screw a greater or lesser amount into said one of said plurality of openings.

6. The stabilizer of claim 5 further comprising a lock nut on each of said cap screws to maintain its axially adjusted position.

7. The stabilizer of claim 1 wherein said generally cylindrical body portion further comprises three equally spaced lobes connected at said second end and being subdivided into three equal portions at said first end, whereby when said nut is tightened on said threaded rod, said tapered portion thereof flexes said thin-walled regions mounting said three equally spaced lobes outwardly into secure engagement within the central opening of the chuck.

8. The stabilizer of claim 1 wherein said expander means comprises a tapered outer surface on a lead portion of said nut.

9. The stabilizer of claim 1 wherein said expander means comprises a cylindrical sleeve having a first outer diameter, a collar having a second greater outer diameter and said tapered outer surface is formed as a transitional zone between said cylindrical sleeve and said collar.

10. The stabilizer of claim 9 wherein said expander means further comprises complimentary surfaces formed within said cylindrical body portion interacting with said tapered outer surface of said transitional zone.

* * * * *